June 26, 1934. M. FELLER 1,964,345
AERATING DEVICE
Filed March 29, 1932  2 Sheets-Sheet 2
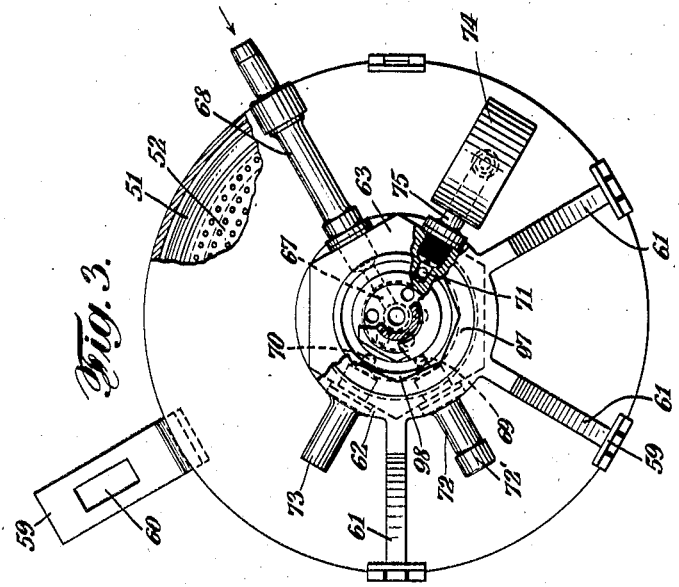
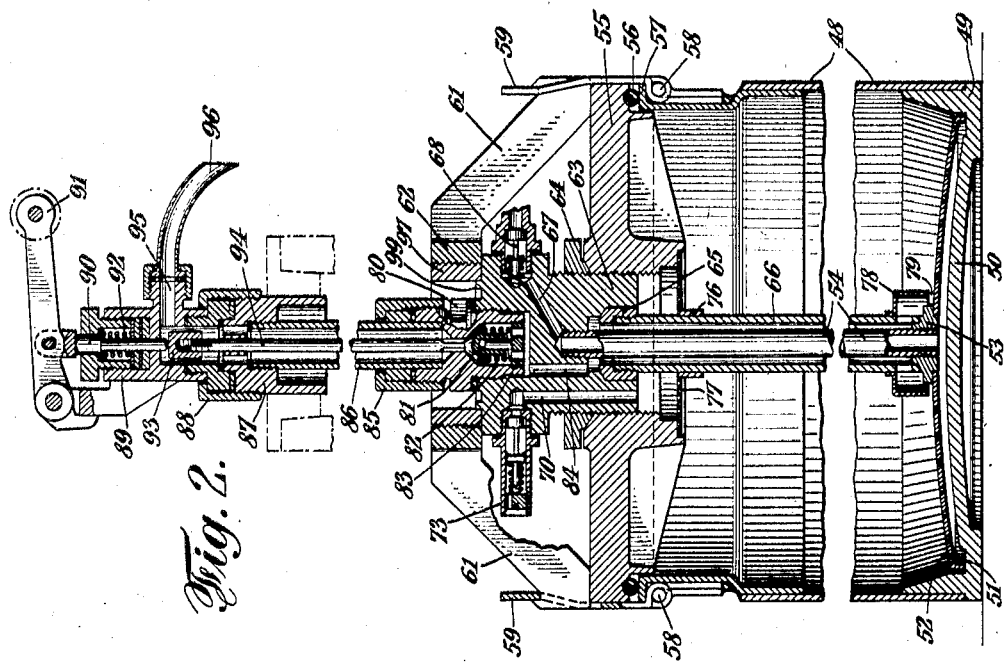
INVENTOR
*Maximilian Feller*
BY *Paul M Klein*
his ATTORNEY Patented June 26, 1934

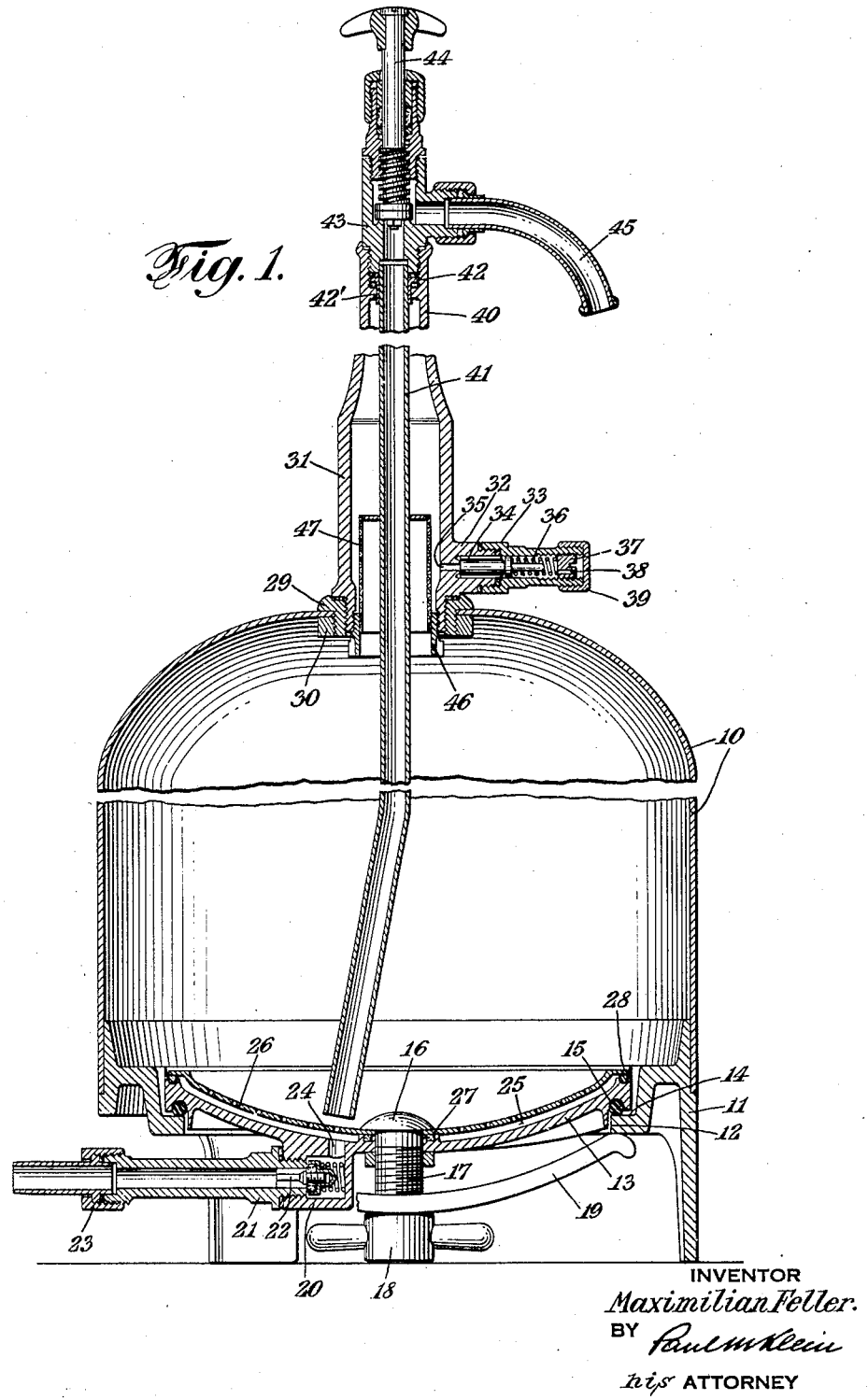

1,964,345

UNITED STATES PATENT OFFICE 1,964,345

AERATING DEVICE

Maximilian Feller, Brooklyn, N. Y., assignor to Henry P. Velte, New York, N. Y.

Application March 29, 1932, Serial No. 601,767

8 Claims. (Cl. 225—17)

This invention relates to devices for carbonating liquid in general, and particularly to a type of devices whereby liquids containing solid matter may be effectively impregnated by gases or other media.

Devices for carbonating liquid, and particularly milk or milk resembling fluids, were designed previously, but generally had the disadvantage of producing inadequate results.

It is quite easy to carbonate liquids having the general physical properties of water, by simply introducing gas under pressure into a closed vessel filled with such liquid. When it is required, however, to carbonate a liquid having a body similar to that of milk, a mere introduction of gases thereinto will not suffice, unless the liquid is agitated through the employment of either external or internal means. Since milk possesses the peculiarity of separating when subjected to agitation, as is the case with most liquids of properties similar to that of milk, it becomes quite evident that in efforts to impregnate milk with a gas through agitation, rather unsatisfactory results will be obtained.

The present invention has for its main object to overcome the aforesaid shortcomings of previous methods and devices, and to provide an effective apparatus for the introduction of gases into not only milk or similar fluids, but also liquids of a much lighter body and having physical characteristics similar to that of water.

Another object of this invention is to provide a charging device for liquids, having means whereby an agitation of the liquid is produced by the frictional engagement of the latter with the gas, in that such gas is introduced at high pressure into the liquid, so as to cause the gas to thoroughly pass through every part of the liquid. This is accomplished by introducing gas into a vessel, partially filled with liquid, at a certain pressure, while at the same time venting the vessel at a reduced pressure, whereby the liquid is maintained, during the charging operation, under a defined working pressure, assuring a uniform penetration of the gas through the liquid, and its absorption by the latter.

A still further object of this invention is to provide within such device, gas accumulating means arranged at the bottom of the device in such a way, that all gas passed through the liquid is forced thereinto in numerous jets from below the very bottom layer of the liquid up to the top thereof, which provision is designed for creating an intimate engagement of the liquid by the through-passing gas, whereby whatever air is contained in the liquid is forcibly separated therefrom and replaced by the gas.

The foregoing and still further objects will become more fully apparent from the following description, in connection with the accompanying drawings, forming part of my disclosure, but by no means intended to limit the same to the actual showing, and in which Fig. 1 is a cross-sectional view through one of the forms of my device.

Fig. 2 is a similar cross-sectional view through another form of my device, and

Fig. 3 is a partial top view of the device shown in Figure 2.

Referring now to Figure 1, numeral 10 denotes the shell of a container provided with a bottom extension 11, serving as support. This bottom extension is provided with an oval aperture 12, through which is passed into the container a similarly shaped closure 13, adapted to be hermetically sealed against ledge 14 of the bottom structure by means of a gasket 15. Closure 13 has an outwardly convex shape and is provided at its centre with a pin 16 which extends through the closure into a threaded portion 17, adapted to be engaged by nut 18. Threaded portion 17 passes through a yoke 19, resting against the outer edge of the closure ledge and is designed for assisting in sealing the closure. Forming a part of closure 13 is a check valve casing 20, to which is secured a connecting sleeve 21. In cooperation with the housing and the sleeve, there will be observed a check valve 22 which is adapted to open inwardly, that is into the casing, and to close outwardly when the pressure within the vessel is greater than the pressure in sleeve 21. A conventional pipe connection 23 facilitates the attachment of a hose or tubing, through which gas under pressure may be conveyed through the valve into the vessel.

Check valve casing 20 is provided with an aperture 24, connecting with a gas accumulating chamber 25, formed between closure 13 and perforated false bottom or strainer 26. The latter is tightly held against closure 13 by pin 16, and is sealed against the inner closure surface by a series of packings indicated at 27 and 28.

At the top of the vessel there is secured, by means of a bushing 29 and nut 30, a hollow column 31, provided with a side extension 32, serving for attaching gas release valve housing 33, in which operates a check valve 34, disposed over opening 35 and controlled by an expansion spring 36. The latter is held in place by an adjustable plug 37, provided with a release opening 38. The end of the housing is provided with a removable cap 39. At the reduced upper end 40 of column 31 there is secured a discharge pipe 41, which extends downwards just above strainer 26. Its upper end is secured by a gland 42 and a series of packings to ledge 42' provided within upper column end 40.

Above pipe 41, and also attached to the upper column end, there will be seen a valve housing 43 containing a hand regulating valve 44, adapted to control the passage of the liquid through outlet 45, connected at the side of the housing.

Gas release check valve 34, connected with the column, controls the discharge of the gas gathering on top of the liquid, after its introduction into the vessel, and may be regulated to any desired pressure by means of adjustable plug 37. At the bottom end of the column there is secured at 46 a strainer 47 extending into the hollow portion of the column, and is intended to prevent liquid from entering aperture 35, controlled by check valve 34.

Referring now to Figures 2 and 3 of the drawings, numeral 48 denotes the outer shell of the vessel, supported by a solid bottom member 49, having its centre portion 50 bowed inwardly, that is, into the vessel, and provided with a seating surface 51, adapted to receive the edge of convex strainer or false bottom 52. The space between strainer 52 and the inner surface of bottom portion 50 forms again a gas accumulating chamber, from which gas under pressure is sprayed in jet forms at a high velocity into the interior of the vessel in such a way, that every particle of its contents comes into frictional engagement with the issuing gas. At the centre of strainer 52 there is provided a bushing 53, to which the strainer is permanently secured and which engages the threaded end of a gas intake pipe 54. Instead of the removable bottom shown in Figure 1, a removable cover is provided in this construction. The latter consists of cover member 55 provided with an annular packing 56, adapted to engage the upper flanged edge 57 of vessel 48. Right below flanged edge 57 there are secured at 58 hinge-straps 59, provided with apertures 60, the latter intended to be engaged by arm 61 of spider 62. The centre of the cover is enlarged and threaded internally for receiving a connecting head 63, which may be fixed in position by locknut 64.

At the bottom of the connecting head there is attached by means of bushing 65, an outer or discharge tubing 66; within which charging pipe 54 is concentrically spaced from its interior wall. The uper end of pipe 54 is connected to head 63, which latter is provided with a passage 67, connecting the pipe with an inwardly opening check valve 68. The latter serves for the same purpose as check valve 22, provided at the bottom of closure 13 shown in Figure 1.

In head 63 there are arranged three outer vertical passages 69, 70 and 71 (see Figure 3). Passage 69 serves for connecting the interior of the vessel with a gas release valve, indicated at 72, of the construction and purpose similar to that shown at the bottom of column 31 of Figure 1. At its end there is provided a closing cap 72'. Passage 70 connects the interior of the vessel with a safety valve 73, which is constructed similarly to release valve 72, with the exception that it is set to a higher pressure and that its end cannot be closed by a cap. Its purpose is to release excessive pressure from the container during the process of charging liquids, or/and vent the filled vessel in the event it is exposed to temperatures higher than normal, which may cause the gas within the vessel to expand and tax the container beyond safety. The third vertical passage 71 connects the interior to gauge 74, which is preferably removed during the period of dispensing the liquid, and which may be connected with the container during the charging operation. The connection 75, between head 63 and gauge 74, is so arranged as to contain a check valve, not shown, which prevents the escape of gas while the gauge is not attached, but which will open to establish connection and to permit reading of the gauge, when the latter is connected.

Associated at 76 with discharge tubing 66, there will be seen a strainer 77 adapted to prevent liquid from entering passages 69, 70 and 71, in the same manner as strainer 47 operates in the design shown in Figure 1. At the bottom of tubing 66 there will be seen a bell 78 which overhangs bushing 53 and is slightly spaced at 79 from false perforated bottom 52. Through this space the liquid is drawn into tubing 66.

At the top of connecting head 63 there is provided a bushing 80, forming at its lower end a housing for a conical check valve 81, urged upwards into closing position by a spring 82, bearing against a perforated, removable plate 83. Through the perforations of this plate communication is established with the interior of the valve housing, and through vertical passages 84 and tubing 66, communication is provided between the valve housing and the vessel.

To the upper threaded portion of bushing 80 there is attached, by means of nut 85, a dispensing tubing 86, at the upper end of which is provided a connecting head 87. To the latter is secured, by means of nut 88, a hand-operated valve arrangement controlling the discharge of the liquid from the vessel. This valve arrangement comprises a valve housing 89, in which is lodged an operating pin 90, adapted to be depressed by handle 91, and normally held in inoperative position by spring 92. This pin abuts at its lower end with an adjustable contact member 93, associated with operating rod 94. The latter extends downwardly through discharge pipe 86, and forms contact with the flat top of cone valve 81, within bushing 80. From the space in which operates pin 90 and abutment member 93, there is provided an outward passage 95 terminating in an adjustable and removable discharge spout 96.

The tightening of the cover against the upper flange of the vessel is accomplished through the cooperation of hinged straps 59 and arms 61 of spider 62. The latter is threaded internally, which threaded portion is engaged by a threaded nut or collar 97, having an octagonal inner opening, indicated at 98, adapted to facilitate turning of the nut by means of a wrench. This collar or nut is guided at its circular bottom end by an annular ridge 99, forming a part of connecting head 63. By screwing in collar 97 against the upper surface of connecting head 63, the cover is forced against the flange of the vessel, while the spider is held in place by hinges 59. Through this arrangement a uniform contact between cover and vessel is assured.

Since the devices shown in Figures 2, 3 and 4 are primarily intended for the purpose of carbonating milk, one of the chief requirements is cleanliness and exchangeability of parts, with the added provision of an easy access to all portions of the interior of the vessel and to the different devices attached thereto.

For this reason the strainers (26 and 52), which are likely to become clogged, are made removable and separable from members 13 and 49, respectively. Similarly the tubing or pipes leading into the vessel are removable so that they may be cleansed, by steaming or in any other manner, to prevent the possibility of old liquid residue lodging therein. The same cleansing requirments apply to top strainers 47 and 77 respectively, and to connecting head 63 and the several passages provided therein, as shown in Figure 2. Similarly all the upper portions of the device connected with head 63, are made readily accessible and dismantable.

*Operation*

The aforedescribed apparatus are both equipped with gas accumulating chambers, substantially covering the entire bottom area of the vessels, the inner wall of which is provided with a great number of minute perforations, adapted to issue gas under high pressure into the interior of the vessel at high velocity, so that the liquid will be subjected to a constant frictional engagement with the issuing gas jets. The construction shown in Figure 1 is intended to, so to speak, concentrate the gas jets against the middle area of the liquid, whereas, in the construction shown in Figure 2, the gas is defused over the entire available area. In the first figure, the thought is to circulate the liquid from within its centre portion against the wall of the vessel and downwards along the side walls and up again in the direction of the centre line. In Figure 2, however, the gas jets pass directly upwards without causing a circulation of the liquid.

In order to thoroughly impregnate liquid with a gas, particularly carbon dioxid, it is necessary that the gas be partially absorbed by the liquid. When milk or milk-like liquids are to be carbonated, one of the first requirements is to drive out the air suspended or dissolved in the milk, and substitute it with carbon dioxid. The mere introduction of the gas under pressure into unagitated liquid, while the latter is in a closed container, will not suffice, for which reason I have provided a method and a device, whereby a thorough through-passage of the gas through the liquid may be maintained, for a desired period of time, so that the air is forcibly divorced from the milk by means of the frictional engagement of the latter with the gas.

For best results the container, after having been thoroughly cleansed, is filled ⅔ or ¾ with milk and sealed. Obviously there will be above the liquid a space filled with atmospheric air which has to be driven out. Connection is made from a bottle containing compressed carbon dioxid, to intake valves 22 or 68, respectively, and a charge of the gas is introduced at a pressure of say 75 lbs. When the pressure in the containers reaches that height, the gas supply ceases. Now valves 32 or 72, respectively, are adjusted to a pressure of say, 60 lbs., while the respective caps 39 and 72' are removed. This setting is made by adjusting plug 37 within the valve housing. The mixture of air and gas contained above the milk is thus released first from the container, and the working pressure within the vessel is reduced to 60 lbs. Through the reduction of pressure within the vessel, check valves 22 and 68, respectively, open and permit the inflow of a fresh gas supply. The gas first accumulates within the bottom chamber, between outer bottom members and strainers 26 and 52, respectively, and issues in jet-form at high velocity into the liquid above, tearing with it the air contained in the milk and bringing it to its upper surface. The gas discharge valves now being open, constantly release the excess pressure of 15 lbs. from the vessel, thereby continuously venting it and providing a steady working pressure of 60 lbs. within the vessel. This through-passage of gas continues for a period of about 5 minutes, after which caps 39 and 72', respectively are replaced, and the gas discharge valves rendered inoperative. Through the closing of these valves, the pressure within the vessel will mount again to 75 lbs., thereby providing a sufficient head pressure above the liquid to enable the dispensing of the liquid practically to the last drop.

The discharge of the ready beverage is governed in the device of Figure 1 by hand valve 44. In Figure 2, handle 91 is to be depressed, so that pin 92 will push down cone-valve 81, whereby connection is established between the interior of vessel 48 and spout 96. The liquid passes from under bell 78, through annular opening 79, in outer tubing 66, from where it rises through vertical passages 84 into the housing of cone valve 81, and from there through dispensing pipe 86 and connection 95 to spout 96. When handle 91 is released, the supply of the beverage is cut off. When the entire contents of the vessels are dispensed, the containers are opened and every part thereof thoroughly cleansed, prior to supplying and charging new liquid.

Through the employment of the aforedescribed devices in the manner outlined, not only a thorough carbonation of any water or water-like liquid may be procured, but a complete saturation of milk by carbon dioxid may be accomplished, when desired. The degree of carbon dioxid absorption may be governed through the time allowed for the through-passage of the gas through the liquid. By means of relatively few tests, the time may be exactly prescribed for any desired degree of carbonation. Since milk increases in its volume, proportionately to degree of its gas absorption, and since the volume of the beverage directly affects its consistency, and since both volume and consistency are depending upon the time allowed for carbonation, both the future volume and the consistency of the beverage may be definitely stated before the carbonation takes place. Thus the properties of carbonated beverages may be readily standardized.

Needless to say that various ingredients may be incorporated with the milk in order to improve the palatability and the nutritious value of the finished beverage, and that similarly other liquids may be pre-mixed, prior to their carbonation. One of the important results of governable carbonation, such as described above, will be found in the fact that milk, thus treated, may be preserved for a considerably longer period of time than is possible to accomplish by any other treatments intended for preserving milk.

The fact that the devices described above are not only used for carbonating a liquid, but also for dispensing the ready beverage, adds to the advantages of the present invention, in that it obviates transportation of pre-prepared beverages to dispensing stations, while enabling anybody to produce his own beverage right at its place of sale thereof by following simple directions.

While I have shown and described specific forms of my device, be it understood that improvements and changes may be made therein, and I therefore reserve for myself the right to make such changes and improvements, without departing from the broad scope of my idea for which I claim.

I claim:

1. A device for carbonating liquids, comprising a sealable vessel, adapted to be filled with a liquid to be charged, a plurality of means associated with said vessel for facilitating the maintenance, for desired time periods, of a thorough through-passage of gas through the liquid, thus providing a frictional engagement between the latter and the gas, such through-passage intended to take place from the lowermost layer of the liquid to the top thereof, said means comprising a gas accumulating chamber adapted to receive gas at high pressure, and having provisions for releasing the gas at high velocity in the form of numerous jets into the liquid, said chamber extending over and forming substantially the entire bottom area of vessel, and adjustable pressure releasing means at the top of the vessel, adapted to vent the latter at a pressure lower than that at which the gas is introduced.

2. A device for charging liquids and for dispensing the latter therefrom when charged, which comprises a sealable vessel having a double bottom forming a gas receiving chamber, one of its walls provided with a plurality of perforations opening into the interior of the vessel, means at the upper end of the vessel for discharging gas, after its penetration through the liquid within the vessel, at a pressure lower than that at which it is introduced, and means for dispensing the charged liquid from the vessel.

3. In a device for charging and dispensing liquids, a vessel provided with a double bottom in the form of a gas accumulating chamber, one of its walls provided with a plurality of perforations issuing into the interior of the vessel, means associated with said chamber for introducing gas under pressure thereinto and checking its outflow therefrom, gas release means arranged at the top of the vessel and having provisions for regulating the discharge pressure of the gas intended to be vented, and liquid dispensing means extending from the interior to without the vessel and having provisions for governing the outflow of liquid.

4. In a device of the class described, a sealable vessel having a removable bottom, the latter formed into a gas accumulating chamber, the inner wall of which is provided with a plurality of perforations issuing into the interior of the vessel, a gas intake connected with said chamber and having valve means for facilitating the introduction of gas into, but preventing its escape from said chamber, an adjustable pressure release valve at the top of the vessel, and dispensing means extending from above the perforated inner chamber wall to without the vessel and provided with means for governing the discharge of liquid.

5. In a device of the class described, a sealable vessel having a removable bottom, the latter formed into a gas accumulating chamber, the inner wall of which is provided with a plurality of perforations issuing into the interior of the vessel, a gas intake connected with said chamber and having valve means for facilitating the introduction of gas into, but preventing its escape from said chamber, an adjustable pressure release valve at the top of the vessel, and dispensing means extending from above the perforated inner chamber wall to without the vessel and provided with means for governing the discharge of liquid, said pressure release valve comprising a housing, a spring induced valve member, an adjusting plug provided with an aperture, and a removable closing cap adapted to render the valve inoperative, when desired.

6. In a device of the class described, a sealable vessel having a double bottom, adapted to form a gas accumulating chamber, the inner wall thereof provided with a plurality of perforations issuing into the interior of the vessel, a centrally disposed gas intake connected with said chamber and provided with valve means for facilitating the introduction of gas into, but preventing its escape from said chamber, adjustable pressure release means, a safety valve and a pressure gauge associated with the top of the chamber, and liquid dispensing means extending centrally through the interior of the vessel from above said perforated inner chamber wall to without, and provided with means for governing the discharge of liquid.

7. A device of the class described, comprising in combination a sealable vessel having a removable cover, means for uniformly sealing the cover against said vessel, a gas accumulating chamber formed at the bottom of said vessel and provided with an inner, perforated wall, a gas intake centrally extending from the cover into said chamber, liquid dispensing means centrally extending from above said wall through the cover to without, inwardly opening check means associated with said gas intake, similar check means associated with said liquid dispensing means and controllable from without, and adjustable pressure releasing, safety and pressure indicating means associated with said cover, said latter means adapted to be removable.

8. A device of the class described, comprising in combination a sealable vessel having a removable cover, means for uniformly sealing the cover against said vessel, a gas accumulating chamber formed at the bottom of said vessel and provided with an inner, perforated wall, a gas intake centrally extending from the cover into said chamber, liquid dispensing means centrally extending from above said wall through the cover to without, inwardly opening check means associated with said gas intake, similar check means provided with said liquid dispensing means and controllable from without, and adjustable pressure releasing, safety and pressure indicating means associated with said cover, said latter means adapted to be removable, a connection provided between said cover and said pressure indicating means, adapted to facilitate the closing of the passage to the interior of the vessel when said pressure indicating means is removed, and to automatically open when the latter is inserted into operative position.

MAXIMILIAN FELLER.